(12) United States Patent
Horikawa et al.

(10) Patent No.: US 7,091,470 B2
(45) Date of Patent: Aug. 15, 2006

(54) PURGE AIR FLOW PASSAGE STRUCTURE

(75) Inventors: Kouji Horikawa, Tokyo (JP); Takurou Nakajima, Tokyo (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 0 days.

(21) Appl. No.: 10/815,857

(22) Filed: Apr. 2, 2004

(65) Prior Publication Data
US 2005/0067588 A1 Mar. 31, 2005

(30) Foreign Application Priority Data
Sep. 26, 2003 (JP) ............................. 2003-335767

(51) Int. Cl.
*H01J 40/14* (2006.01)
*G01J 5/00* (2006.01)

(52) U.S. Cl. ........................................ 250/216; 374/125
(58) Field of Classification Search ................ 250/216, 250/239, 338.3; 60/657; 356/43, 44; 374/121, 374/125, 132, 144
See application file for complete search history.

(56) References Cited

U.S. PATENT DOCUMENTS

| 4,786,188 A | * | 11/1988 | Myhre et al. ............... 374/125 |
| 4,797,559 A | * | 1/1989 | Oblad et al. ................ 356/342 |
| 4,836,689 A | * | 6/1989 | O'Brien et al. ............. 374/125 |
| 4,919,505 A | * | 4/1990 | Bartosiak et al. ........... 374/130 |
| 4,934,137 A | * | 6/1990 | MacKay ........................ 60/803 |
| 5,146,244 A | * | 9/1992 | Myhre et al. ................ 359/509 |
| 5,331,178 A | * | 7/1994 | Fukuda et al. .............. 250/239 |
| 5,397,181 A | * | 3/1995 | McNulty ..................... 374/144 |
| 5,421,652 A | * | 6/1995 | Kast et al. ................... 374/208 |
| 6,182,642 B1 | * | 2/2001 | Ohkuma ..................... 123/520 |
| 6,490,040 B1 | * | 12/2002 | Berthold et al. ............ 356/438 |
| 6,766,648 B1 | * | 7/2004 | Miliani et al. ................ 60/803 |

OTHER PUBLICATIONS

Patent Abstracts of Japan, "Semiconductor Device," publication No. JP 01196865A, published Aug. 8, 1989.

* cited by examiner

*Primary Examiner*—Thanh X. Luu
*Assistant Examiner*—Stephen Yam
(74) *Attorney, Agent, or Firm*—Griffin & Szipl, P.C.

(57) ABSTRACT

A purge air flow passage structure has an air flow passage for ventilating the purge air, a separation space that is provided in the air flow passage and separates dust in the purge air therefrom, and a filter that is provided in the air flow passage, is positioned upstream of the separation space, and collects dust in the purge air. The filter includes two or more shielding parts each of which has a plurality of passing holes r slits arranged in the width direction of the filter. The shielding parts are successively arranged in the air flow passage to be separated from each other by a predetermined distance in the air flow direction. Each of the shielding parts includes a wall portion facing upstream that is positioned such that the wall portion is struck by the purge air that passed through the passing hole of the neighboring upstream shielding part.

2 Claims, 4 Drawing Sheets

PURGE AIR FLOW PASSAGE STRUCTURE

This application claims priority from Japanese Patent Application No. 2003-335767, filed Sep. 26, 2003, the entire disclosure of which is incorporated herein by reference.

BACKGROUND OF THE INVENTION

1. Field of the Invention

The present invention relates to a purge air flow passage structure for supplying purge air to a surface of a light receiving part of an optical probe such as a radiation thermometer. Specifically, the present invention relates to a purge air flow passage structure that can effectively collects dust in purge air flowing in an air flow passage, and separates the dust from the purge air.

2. Description of the Related Art

In the case of the operation of a gas turbine engine, combustion air compressed by a compressor is mixed with fuel, and the combustion air including the fuel is combusted by a combustor to produce combustion gas. The combustion gas causes a turbine to rotate, generating engine driving force, that is, output torque.

According to such a gas turbine engine, temperature at a gas turbine entrance is raised so that performance of the gas turbine can be improved. However, when a temperature at the gas turbine entrance becomes higher than the tolerable temperature for the turbine blade, the turbine blade is damaged. For this reason, in order to suppress temperature raise of the turbine blade, engine control is performed to control temperature, or cooling structure for the turbine blade is adopted.

In terms of safety and service life of the engine, it is very important to perform monitoring to maintain: the condition (1) that temperature of the turbine blade does not become higher than a specified value; and/or the condition (2) that the cooling structure for the turbine blade normally function in the case of adopting the structure. A radiation thermometer 20 as shown in FIG. 1 is used to measure surface temperature of a turbine rotor blade. As shown in FIG. 1, the probe 1 of the radiation thermometer 20 is disposed at the turbine case 3 of the gas turbine. In FIG. 1, the reference numeral 21 designates a turbine stator blade, 22 the turbine rotor blade, and 23 combustion gas.

When dust or the like attaches to the surface of a light receiving part (lens or window) of the radiation thermometer probe 1, the temperature measurement cannot be normally performed. In addition, since the radiation thermometer is disposed at the turbine case, and the surface of the light receiving part of the radiation thermometer is exposed to combustion gas having high temperature, there is a possibility that the light receiving part is damaged, and the radiation thermometer is deprived of the temperature measurement function. For this problem, the purge air flow is brought to the surface of the light receiving part so that the dust can be prevented from attaching to the surface of the light receiving part, and further, the light receiving part can be protected from high-temperature combustion gas.

Compressed air extracted from a compressor is used as the purge air, but the purge air itself contains dust. If the flow of the purge air containing dust is brought to the surface of the light receiving part, the surface of the light receiving part becomes tainted by the dust of the purge air. Accordingly, it is necessary to remove the dust from the purge air before purging (cleaning) the surface of the light receiving part by using the purge air.

FIG. 2 shows a conventional example of a purge air cooling structure that has a function of removing dust from the purge air. In FIG. 2, the structure is partially cut out for understanding. In this drawing, the reference numeral 1 designates the probe of a radiation thermometer, 2 a lens (light receiving part), and 15 a nozzle. As shown in FIG. 2, a space for an air flow passage for purge air 9 is formed between the probe 1 of the radiation thermometer and the nozzle 15. The purge air 9 is supplied from the upstream air flow passage (at the right side in FIG. 2), and passes through a separation space formed near the outer edge of the lens attaching part where the lens 2 is attached. Thereafter, the flow of the purge air 9 is brought to the surface of the lens 2 so that the surface of the lens 2 can be purged by the purge air flow, and then, the purge air that was used to purge the lens 2 flows out to the turbine side. Specifically, in the separation space 8, the dust is separated from the purge air 9 by the inertia, the purge air 9 separated from the dust flows out from a penetration hole 7 at the upstream part in the separation space 8, and dust 10 flows out from a penetration hole 6 at the downstream part in the separation space 8 together with the purge air 9. The technique of purging the surface of the light receiving part by the purge air is disclosed in Japanese Laid-Open Patent Publication No. 11-96865.

However, even when the above-described separation space is provided, an effect of separating the dust from the purge air is not adequate, and it is difficult to completely separate the dust from the purge air. Thus, there is still a problem that the dust attaching to the surface of the light receiving part hinders temperature measurement.

SUMMARY OF THE INVENTION

The present invention was made to solve the above problems. That is, it is an object of the present invention to provide a purge air flow passage structure that can effectively collect and separate dust contained in a purge air.

In order to achieve the above object, according to the present invention, there is provided a purge air flow passage structure for introducing purge air to a space at or near a surface of a light receiving part of an optical probe that detects radiation light of an object, comprising: an air flow passage for ventilating the purge air; a separation space that is provided in the air flow passage and separates dust in the purge air therefrom; and a filter that is provided in the air flow passage, is located upstream of the separation space, and collects dust in the purge air.

Preferably, in the above purge air flow passage structure, the filter includes two or more shielding parts each of which has a plurality of passing holes or slits formed in a width direction thereof, the shielding parts are successively arranged along a direction from an upstream side to a downstream side in the air flow passage to be separated from each other by a predetermined distance, and each of the shielding parts includes a wall portion facing upstream that is positioned such that the wall portion is struck by the purge air that passed through the passing hole or slit of the neighboring upstream shielding part.

Preferably, the above purge air flow passage structure is structured such that flow velocity ratio Vb/Va is within a range from 0.8 to 1.3 when Va is flow velocity of the purge air passing an exit of a penetration hole provided at an upstream part in the separation space to introduce the purge air from the separation space to the space at or near the surface of the light receiving part, and Vb is flow velocity of the purge air passing an exit of the passing hole or slit of the most upstream shielding part.

In the above purge air flow passage structure, not only the separation space that separates the dust in the purge air from the purge air is provided in the air flow passage, but also the filter that collects the dust in the purge air is provided at the upstream part in the air flow passage. Accordingly, it is possible to collect the dust in the purge air when the purge air passes through the filter. Furthermore, the dust that was not collected by the filter can be separated from the purge air by the inertia in the separation space positioned at the downstream part in the air flow passage. Thereby, it is possible to remove almost all dust from the purge air introduced to the space at or near the lens surface of the optical probe.

Further, in the above purge air flow passage structure, the filter includes two or more shielding parts each of which has a plurality of passing holes or slits through which the purge air passes. The passing holes or slits are arranged along the width direction of the filter (the width direction corresponds to the circumferential direction of the filter as described later). The respective shielding parts are successively arranged along the direction from the upstream side to the downstream side. Each of the shielding parts includes the wall portion that face upstream and that is positioned such that the wall portion is struck by the purge air passing through the passing hole or slit of the neighboring upstream shielding part. Accordingly, the purge air that passed through the passing hole or slit of the shielding part strikes the wall portion of the neighboring downstream shielding part that faces upstream so that the dust in the purge air can attach to this wall portion. Thereby, it is possible to effectively collect the dust in the purge air.

Further, the above purge air flow passage structure is structured so as to have flow velocity ratio Vb/Va that is within a range from 0.8 to 1.3. The ratio Vb/Va is the ratio between flow velocity Vb of the purge air passing the exit of the passing hole or slit of the most upstream shielding part and flow velocity Va of the purge air passing the exit of the penetration hole at the upstream part in the separation space. With this structure, it is possible to improve the efficiency of collecting the dust.

Thus, the purge air flow passage structure according to the present invention has an excellent advantage in that the dust in the purge air can be effectively collected and separated.

Other objects and advantageous features of the present invention will become apparent from the following description of the preferred embodiment with reference to the accompanying drawings.

DESCRIPTION OF THE PREFERRED EMBODIMENT

Figure 1:
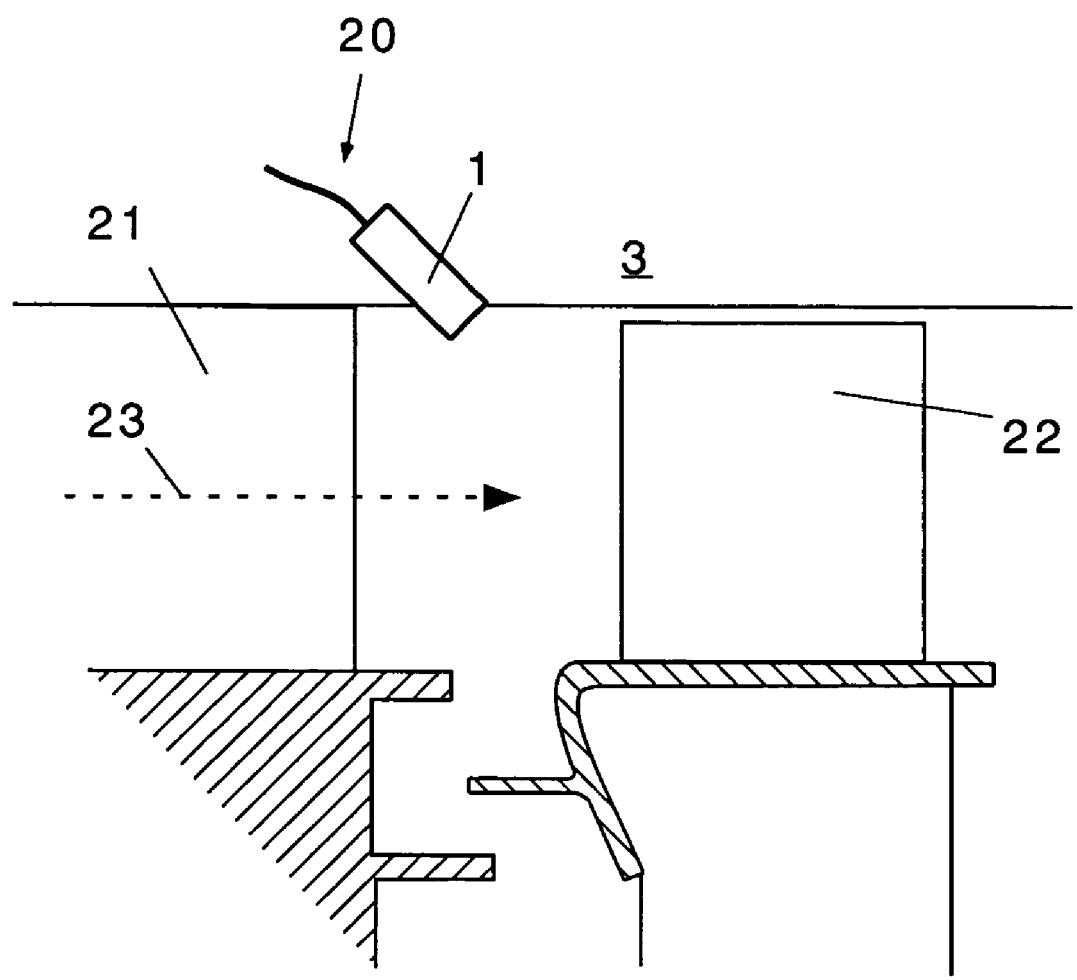
FIG. 1 shows a structure of a gas turbine to which a radiation thermometer is attached.
Figure 2:
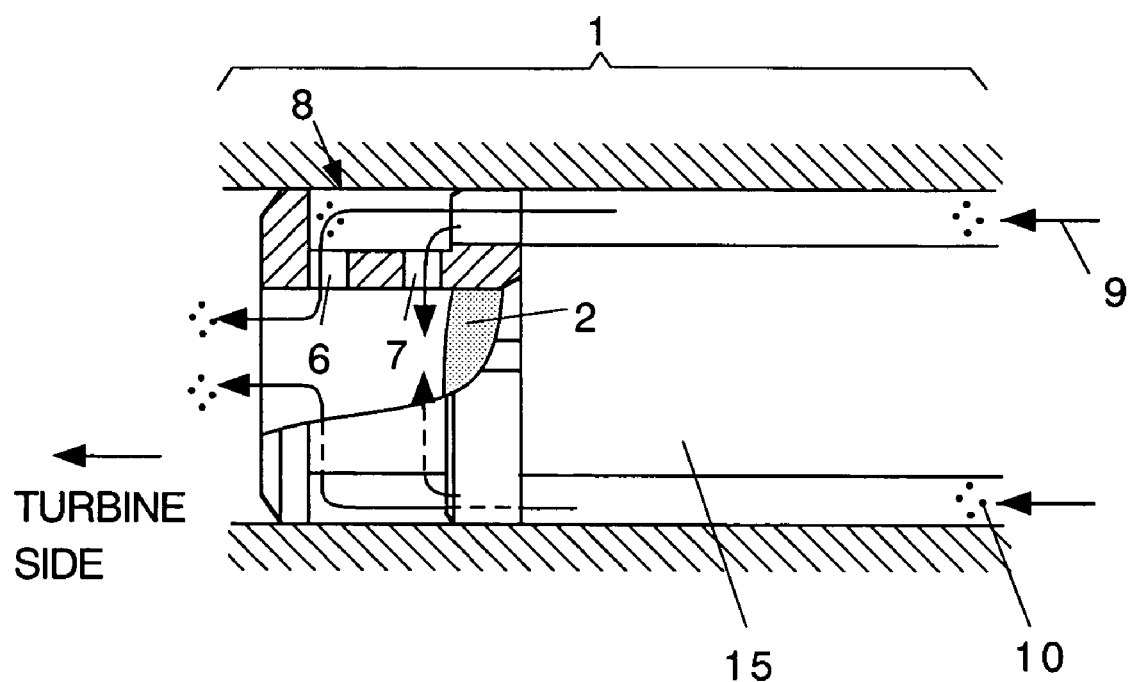
FIG. 2 shows a conventional purge air flow passage structure of the radiation thermometer.

In the following, a preferred embodiment of the present invention will be described with reference to FIGS. 3 and 4. In each drawing, the same reference numeral is attached to the same part.

Figure 3:
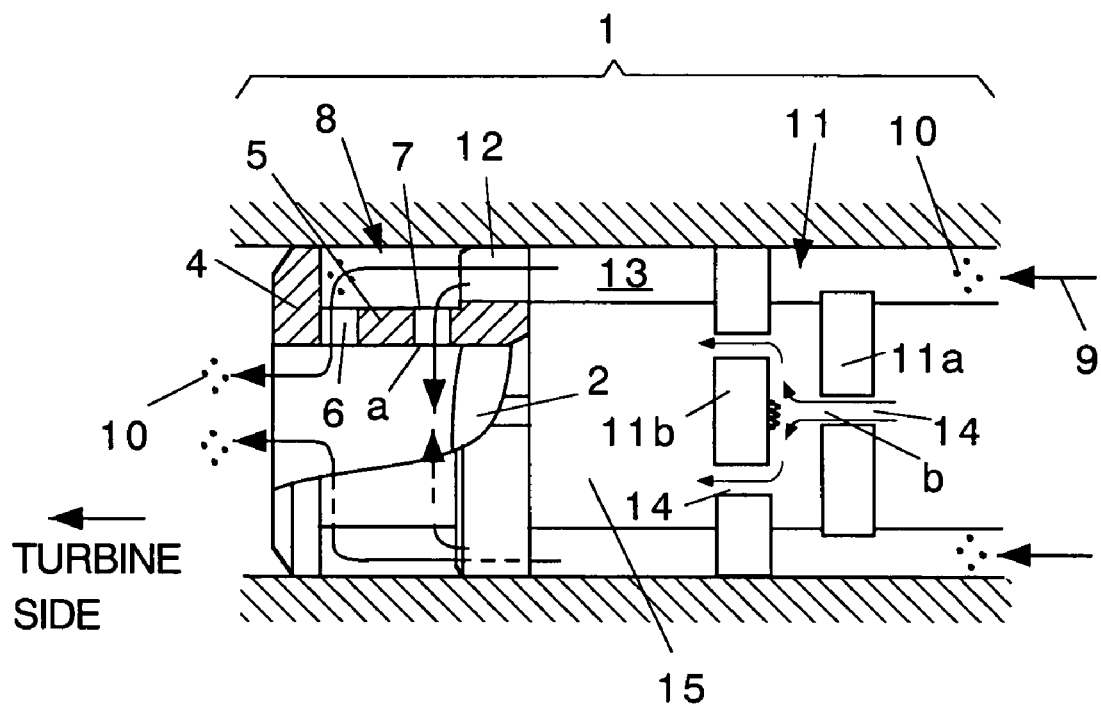
FIG. 3 shows a purge air flow passage structure according to an embodiment of the present invention.
Figure 4:
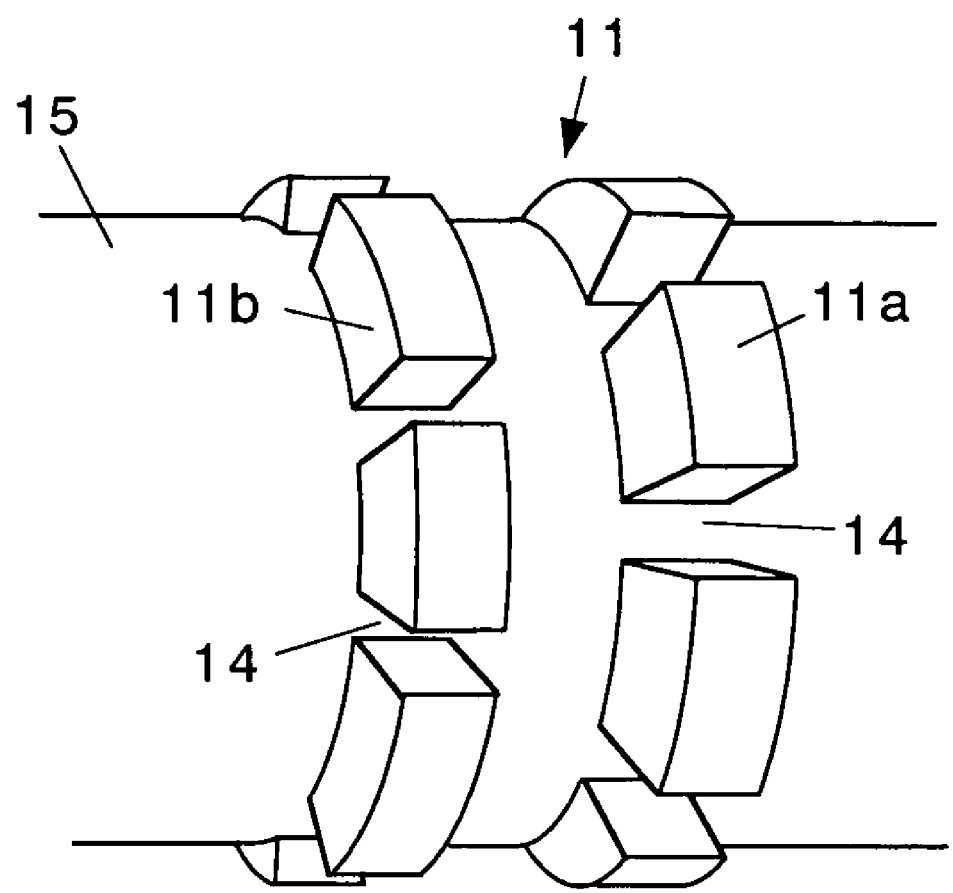
FIG. 4 shows a structure of a filter according to the embodiment of the present invention.

A purge air flow passage structure according to an embodiment of the present invention is shown in FIG. 3. In this drawing, the reference numeral 1 designates a probe 1 of a radiation thermometer (hereinbelow, simply referred to as a probe), and 15 a nozzle. The entire shape of the probe 1 is cylindrical shape, and a lighting space in which radiation light passes is formed inside the probe 1. A lens 2 is attached at the position a little separated from the front end part of the probe 1 in the axial direction of the probe 1. The outer circumferential part of the front end part and the outer circumferential part of the attaching part of the lens 2 are respectively formed as brim parts that are brim-shaped and have the same outer diameter. Hereinbelow, the brim part of the front end part 4 is referred to as a first brim part, and the brim part of the attaching part of the lens 2 is referred to as a second brim part.

The second brim part is divided into a plurality of portions that are separated from each other by a predetermined distance along the circumferential direction of the second brim part. Each space between the respective neighboring divided portions of the second brim part is formed as a passing space 12 in which purge air 9 supplied from the upstream side passes. A connecting part 5 is provided between the inner space of the front end part 4 and the outer space (passing space 12 or separation space 8) of the attaching part of the lens 2. Penetration holes 6 at the downstream side on the connection part 5, and penetration holes 7 at the upstream side on the connecting part 5 are formed at a plurality of positions along the circumferential direction of the connecting part 5. The penetration holes 6 and 7 enable the inner space of the connecting part 5 to communicate with the outer space of the connecting part 5. As described later, the penetration holes 7 at the upstream side introduce the purge air 9 from the separation space 8 to the space at or near the surface of the light receiving part.

In order to attach the probe 1, the probe 1 is inserted into a probe attaching hole formed on a turbine case. An annular air flow passage 13 in which the purge air 9 flows is formed between the probe 1 and the nozzle 15. A space surrounded and defined by the first brim part, the second brim part, and the connecting part 5 is the separation space 8 that separates dust 10 from the purge air 9 by inertia. A filter 11 that collects dust 10 contained in the purge air 9 is provided upstream of the separation space 8 in the air flow passage 13. A structure of the filter 11 is shown in FIG. 4. A first shielding part 11a and a second shielding part 11b of the filter 11 are provided such that the second shielding part 11b is located downstream of the first shielding part 11a, and is separated from the first shielding part 11a by a predetermined distance in the axial direction of the nozzle 15. A plurality of spaces as passing holes or slits 14 in which the purge air 9 passes are formed at the first shielding part 11a and at the second shielding part 11b, along the circumferential direction of the nozzle 15. The second shielding part 11b is provided such that the purge air 9 that has passes through each passing hole or slit 14 of the first shielding part 11a strikes a wall portion of the second shielding part 11b that faces upstream. In other words, the position of each wall portion of the second shielding part 11b is separated in the circumferential direction from the position to which the purge air from the passing hole or slit 14 of the first shielding portions 11a flows straight.

In this embodiment, the filter 11 has the first and second shielding parts, but may have three or more shielding parts in accordance with required dust collecting ability. For example, when a third shielding part is provided downstream of the second shielding part 11b to be separated from the second shielding part 11b by a predetermined distance, each wall portion of the third shielding part that faces upstream is located at the position to which the purge air from the passing hole or slit 14 of the second shielding part 11b comes straight.

Next, the flow of the purge air in the above-described purge air flow passage structure will be described. In FIG. 3, the purge air 9 that is supplied from the upstream side (right side in the drawing) passes through the filter 11. At this time, the purge air 9 that has passed through the passing holes or slits 14 of the first shielding part 11a strikes the respective wall portions of the second shielding part 11b that face upstream, so that the dust 10 in the purge air 9 attaches to these wall portions of the second shielding part 11b. Thereby, the dust 10 in the purge air 9 can be effectively collected. Then, the purge air 9 from which the dust 10 is removed changes the flowing direction to the circumferential direction of the nozzle 15 for the time being. Thereafter, the purge air 9 passes through the passing holes or slits 14 of the second shielding part 11b. The purge air 9 that has passed through the passing holes or slits 14 of the second shielding part 11b further passes through the passing space 12 of the second brim part, and flows into the separation space 8.

If this purge air 9 contains the dust that the filter 11 was not able to collect, the dust flows straight together with the purge air in the separation space 8, and passes through the penetration hole 6 at the downstream side on the connecting part 5 to flow out to the turbine side. On the other hand, the purge air that has not flowed straight but has passed through the penetration hole 7 at the upstream side on the connecting part 5 is brought to the surface of the lens 2 so that the lens surface can be purged (cleaned) by the purge air flow, and then this purge air flows out to the turbine side.

As described above, not only the separation space 8 that separates dust in the purge air 9 from the purge air 9 is provided in the air flow passage, but also the filter 11 that collects dust in the purge air 9 is provided at the upstream side of the air flow passage 13. Thereby, it is possible to collect the dust when the purge air 9 passes through the filter 11. Further, the dust that was not collected by the filter 11 is separated from the purge air by inertia in the separation space 8 positioned downstream of the filter 11. Thereby, it is possible to remove almost all dust from the purge air 9 that is introduced to the lens 2 to purge the lens 2. The dust 10 collected by the filter 11 can be removed from the filter 11 by periodically performing the overhaul.

The purge air flow passage is preferably structured such that when Va is flow velocity of the purge air 9 passing the exit (indicated by "a" in FIG. 3) of the penetration hole 7, and Vb is flow velocity of the purge air 9 passing the exit (indicated by "b" in FIG. 3) of the most upstream shielding part 11a, the ratio (Vb/Va) of Vb to Va is within the range from 0.8 to 1.3. It became apparent by the experiment that the efficiency of collecting the dust can be improved by structuring the purge airflow passage to have the ratio Vb/Va of 0.8 to 1.3.

In the above embodiment, the purge air flow passage structure of the radiation thermometer probe 1 is described, but the present invention is not limited to this. Of course, the present invention can be applied to a purge air flow passage of other optical probes such as a probe of a photoelectric switch.

Further, the present invention is not limited to the above-described embodiment, and various modifications can be applied to the present invention without departing from the scope of the present invention.

What is claimed is:

1. A purge air flow passage structure for introducing purge air to a space at or near a surface of a light receiving part of an optical probe that detects radiation light of an object, comprising:

an air flow passage disposed inside the probe for ventilating the purge air;

a separation space, disposed in the air flow passage, that separates dust in the purge air from the purge air; and a filter, disposed in the air flow passage, upstream of the separation space, that collects dust in the purge air, wherein the filter comprises two or more shielding parts, wherein each of said shielding parts has a plurality of passing holes or slits formed in a width direction thereof, said shielding parts are successively arranged along a direction from an upstream side to a downstream side in the air flow passage to be separated from each other by a predetermined distance, and each of said shielding parts includes a wall portion facing upstream that is positioned such that the wall portion is struck by the purge air that passed through the passing hole or slit of the neighboring upstream shielding part.

2. The purge air flow passage structure according to claim 1, structured such that a flow velocity ratio Vb/Va is within a range from 0.8 to 1.3 when Va is flow velocity of the purge air passing an exit of a penetration hole provided at an upstream part in the separation space to introduce the purge air from the separation space to the space at or near the surface of the light receiving part, and Vb is flow velocity of the purge air passing an exit of the passing hole or slit of the most upstream shielding part.

* * * * *